(12) United States Patent
Lee et al.

(10) Patent No.: US 12,108,123 B2
(45) Date of Patent: Oct. 1, 2024

(54) METHOD FOR EDITING IMAGE ON BASIS OF GESTURE RECOGNITION, AND ELECTRONIC DEVICE SUPPORTING SAME

(71) Applicant: SAMSUNG ELECTRONICS CO., LTD., Suwon-si (KR)

(72) Inventors: Bona Lee, Suwon-si (KR); Seonhwa Kim, Suwon-si (KR); Heekyung Moon, Suwon-si (KR); Youngil Oh, Suwon-si (KR); Hyemi Yu, Suwon-si (KR); Jonghyun Han, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 55 days.

(21) Appl. No.: 17/896,962

(22) Filed: Aug. 26, 2022

(65) Prior Publication Data

US 2022/0408164 A1 Dec. 22, 2022

Related U.S. Application Data

(63) Continuation of application No. PCT/KR2021/002199, filed on Feb. 22, 2021.

(30) Foreign Application Priority Data

Feb. 28, 2020 (KR) .................. 10-2020-0025515

(51) Int. Cl.
*H04N 21/81* (2011.01)
*G06F 3/01* (2006.01)
(Continued)

(52) U.S. Cl.
CPC ......... *H04N 21/8146* (2013.01); *G06F 3/011* (2013.01); *G06F 3/017* (2013.01); *G06T 13/40* (2013.01); *G11B 27/031* (2013.01)

(58) Field of Classification Search
None
See application file for complete search history.

(56) References Cited

U.S. PATENT DOCUMENTS 9,454,336 B1 9/2016 Rudradevan et al.
10,026,401 B1 7/2018 Mutagi et al.
(Continued)

FOREIGN PATENT DOCUMENTS

JP 2009284037 A * 12/2009
JP 6206699 B2 10/2017
(Continued)

OTHER PUBLICATIONS

International Search Report and Written Opinion for International Application No. PCT/US2021/002199; International Filing Date Feb. 22, 2021; Date of Mailing Jun. 9, 2021; 53 Pages.

*Primary Examiner* — James A Thompson
(74) *Attorney, Agent, or Firm* — CANTOR COLBURN LLP

(57) ABSTRACT

An electronic device includes a memory, at least one camera module, and a processor operatively connected to the memory and the at least one camera module. The processor is configured to, while acquiring first recording data by using the at least one camera module, detect at least one designated gesture input on the basis of at least a part of the acquired first recording data. The processor executes a function corresponding to the detected gesture input. The processor creates and stores a second recording data in the memory. The second recording data includes data remaining after excluding, from the acquired first recording data, recording data corresponding to a time interval from the detection initiation time point of the detected gesture input to detection termination time point of same.

16 Claims, 13 Drawing Sheets

(51) Int. Cl.
*G06T 13/40* (2011.01)
*G11B 27/031* (2006.01)

(56) References Cited

U.S. PATENT DOCUMENTS

| | | | |
|---|---|---|---|
| 10,884,525 B1* | 1/2021 | Vonsik | G06F 3/011 |
| 2002/0041327 A1 | 4/2002 | Hildreth et al. | |
| 2010/0040292 A1* | 2/2010 | Clarkson | G06F 3/017 |
| | | | 382/201 |
| 2010/0208102 A1 | 8/2010 | Kuriyama | |
| 2012/0050530 A1 | 3/2012 | Raman et al. | |
| 2013/0242124 A1 | 9/2013 | Mukai | |
| 2014/0211047 A1 | 7/2014 | Lee et al. | |
| 2015/0058342 A1* | 2/2015 | Kim | G06F 16/48 |
| | | | 707/736 |
| 2017/0076720 A1 | 3/2017 | Gopalan et al. | |
| 2018/0004482 A1* | 1/2018 | Johnston | G10L 15/22 |
| 2018/0048831 A1* | 2/2018 | Berwick | G11B 27/031 |
| 2020/0213727 A1* | 7/2020 | Wang | H04R 3/005 |

FOREIGN PATENT DOCUMENTS

| | | |
|---|---|---|
| JP | 2020013348 A | 1/2020 |
| KR | 20100094401 A | 8/2010 |
| KR | 101263881 B1 | 5/2013 |
| KR | 20130106833 A | 9/2013 |
| KR | 20140005634 A | 1/2014 |
| KR | 20140096843 A | 8/2014 |
| KR | 20180017073 A | 2/2018 |

\* cited by examiner

| Gesture input | Executed function | Gesture input | Executed function |
|---|---|---|---|
| Gesture of pinching with two fingers | Zoom in / Zoom out | Gesture of opening /Closing two arms | Video effect display / Release |
| Gesture of drawing counterclockwise circle with one finger | Rewind recorded video according to speed or number of drawing circle | Gesture of opening mouth | Sticker display |
| Single clap gesture | Pause of recording / Start of recording | Gesture of cutting with two fingers | Cancel just previous gesture |

FIG.2

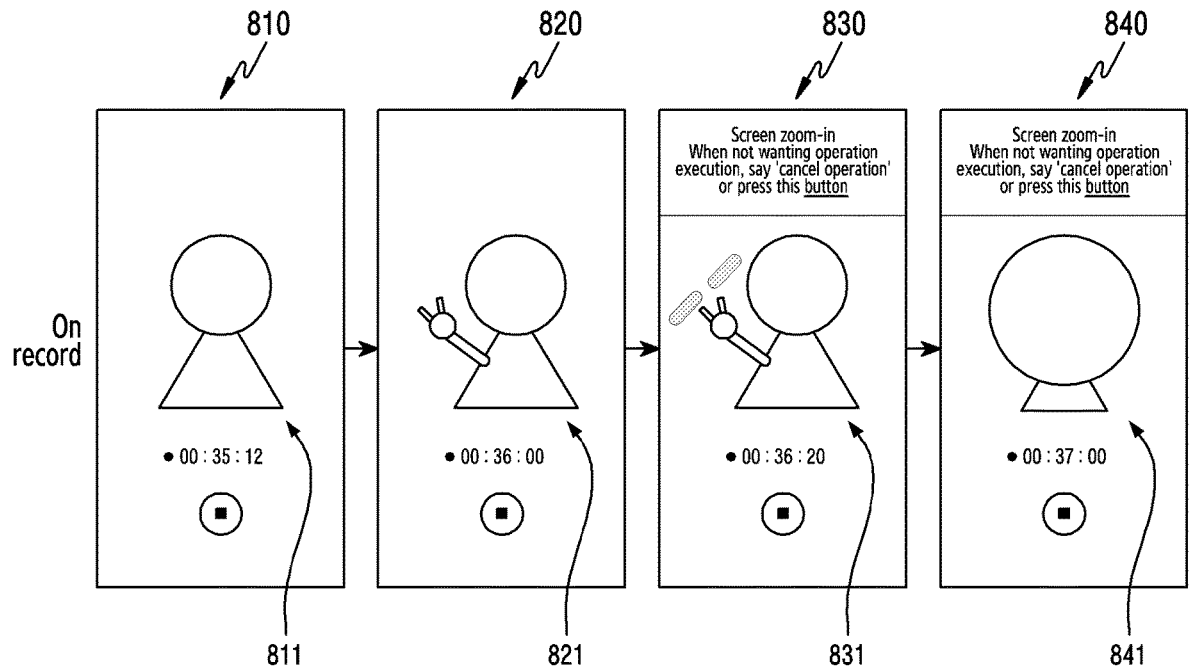
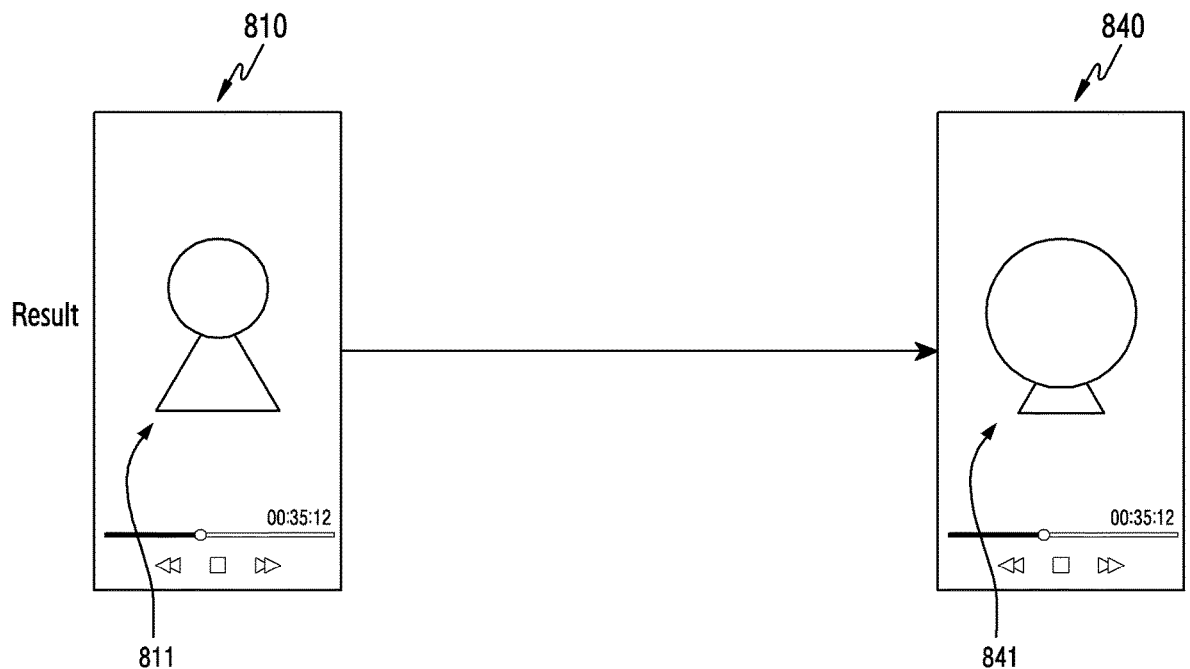
FIG.8

METHOD FOR EDITING IMAGE ON BASIS OF GESTURE RECOGNITION, AND ELECTRONIC DEVICE SUPPORTING SAME

CROSS-REFERENCE TO RELATED APPLICATIONS

This application is a continuation application, claiming priority under § 365(c), of International Application No. PCT/KR2021/002199 designating the United States, filed on Feb. 22, 2021, in the Korean Intellectual Property Receiving Office and claiming priority to Korean Patent Application No. 10-2020-0025515, filed on Feb. 28, 2020, in the Korean Intellectual Property Office, the disclosures of which are incorporated by reference herein in their entireties.

TECHNICAL FIELD

Various embodiments disclosed in the present document relate to computing technology and particularly to editing a video on the basis of gesture recognition.

BACKGROUND ART

Electronic devices provide various input schemes as a part of supporting an interaction with a user. For example, the electronic device can support a gesture input scheme to recognize a gesture that includes a motion of a user's body, and can perform one or more operations in response, based on a comparison with a predefined gesture.

Technical Problem

A gesture input scheme can be used when gripping or approaching an electronic device may not be feasible for a user. For example, a gesture input performed during a recording of a video by a mounted electronic device can facilitate a user to control the recording of a video, without a direct touch between the user's body and the electronic device.

However, the motion of the user's body to trigger the gesture input is recorded as a part of the video, which may not be desired, and causes an interruption of flow, or distraction that can lead to a degraded quality of the video by causing a break in an experience of a video viewer.

Various embodiments disclosed in the present document facilitate technical solutions for editing a video based on gesture recognition. One or more embodiments described herein also facilitate executing a predefined operation (or function), based on recognition of a gesture input, in a video recording operation.

Also, various embodiments disclosed in the present document facilitate editing a video based on recognition of a gesture and, in response, providing a recorded video from which the motion of a user's body to cause the gesture is excluded.

Technical Solution

An electronic device of an embodiment may include a memory, at least one camera module, and a processor operatively connected to the memory and the at least one camera module.

According to an embodiment, the processor may, while acquiring first recording data by using the at least one camera module, detect at least one specified gesture input, based on at least a part of the acquired first recording data, execute a function corresponding to the detected gesture input, and store second recording data in the memory, the second recording data being data remaining after excluding, from the acquired first recording data, recording data corresponding to a time interval from a detection initiation time point of the detected gesture input to a detection termination time point of the detected gesture input.

A method for editing a video on the basis of gesture recognition in an electronic device of an embodiment may include, while acquiring first recording data by using at least one camera module, detecting at least one specified gesture input, based on at least a part of the acquired first recording data, executing a function corresponding to the detected gesture input, and storing the second recording data in a memory, the second recording data being data remaining after excluding, from the acquired first recording data, recording data corresponding to a time interval from a detection initiation time point of the detected gesture input to a detection termination time point of the detected gesture input.

Advantageous Effects of Invention

According to various embodiments, a viewer of a recorded video is not presented with an extraneous motion that triggers a recognized gesture input. To this end, embodiments described herein facilitate excluding (removing), from a recorded video, a motion of a user's body that is recognized as a gesture input. Embodiments herein, accordingly facilitate improving an immersion or experience on the viewing of the recorded video.

In addition, various effects directly or indirectly identified through the present document may be presented.

BRIEF DESCRIPTION OF DRAWINGS

FIG. 2 is a diagram illustrating examples of various gesture inputs recognizable by an electronic device and functions corresponding to the gesture inputs according to an embodiment.

FIG. 8 is a diagram illustrating an example of excluding a gesture input from a recorded video according to an embodiment.

In relation to a description of the drawings, the same reference numerals may be assigned to the same or corresponding components.

DETAILED DESCRIPTION

Hereinafter, various embodiments of the present disclosure are disclosed with reference to the accompanying drawings. However, the present disclosure is not intended to be limited by the various embodiments of the present disclosure to a specific embodiment and it is intended that the present disclosure covers all modifications, equivalents, and/or alternatives of the present disclosure provided they come within the scope of the appended claims and their equivalents.

Figure 1:
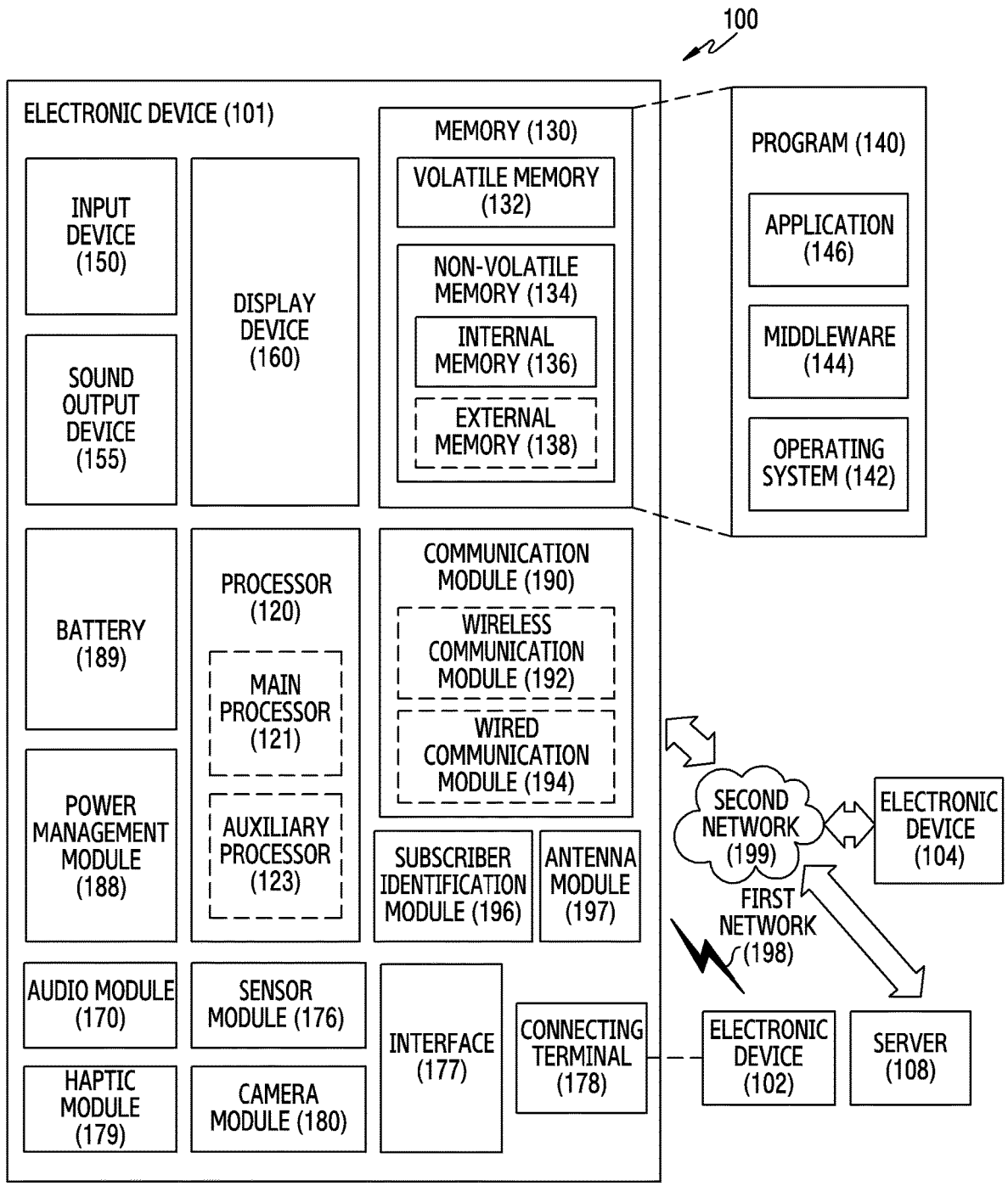
FIG. 1 is a diagram illustrating an electronic device in a network environment according to an embodiment.

FIG. 1 is a diagram illustrating an electronic device in a network environment according to an embodiment.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen). The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Before describing various embodiments of the present invention, a gesture input applicable to the various embodiments may be described with reference to FIG. 2, FIG. 3, and FIG. 4.

FIG. 2 is a diagram illustrating examples of various gesture inputs recognizable by an electronic device and functions corresponding to the gesture inputs according to an embodiment. FIG. 3 is a diagram illustrating a user interface of visually presenting various gesture inputs recognizable by the electronic device according to an embodiment. FIG. 4 is a diagram illustrating an example of additionally defining various gesture inputs recognizable by the electronic device according to an embodiment.

According to an embodiment, the electronic device (e.g., the electronic device 101 of FIG. 1) may support a gesture input that is performed by a user motion (e.g., a continuous movement of a user's body or a specific posture of the user's body), and may store reference data for each of at least one gesture in order to recognize the gesture input. In this regard, a processor (e.g., the processor 120 of FIG. 1) of the electronic device 101 may present a request for defining the at least one gesture (e.g., a message of requesting a first gesture input to a user) in an initial setting operation for building a gesture input system. In response to the request, the processor 120 may acquire data on a gesture performed by a user. For example, the processor 120 may control a camera module (e.g., the camera module 180 of FIG. 1) to record a video (e.g., a moving picture) including a user motion related to the gesture execution, thereby acquiring recording data on a user gesture. In an embodiment, the processor 120 may extract feature information from recording data acquired for each of at least one gesture, and provide reference data that may be referred for recognizing a corresponding gesture, based on the feature information. The processor 120 may store the provided reference data in a memory (e.g., the memory 130 of FIG. 1).

According to various embodiments, the electronic device 101 may access reference data used to recognize at least one gesture from an external electronic device (e.g., the electronic device 102 or the electronic device 104 of FIG. 1) or an external server (e.g., the server 108 of FIG. 1). In this regard, the electronic device 101 may establish a gesture input system, with the external electronic device 102 or 104 or the server 108, and may acquire information on at least one gesture defined on the gesture input system, and reference data necessary for recognizing the corresponding gesture, from the external electronic device 102 or 104 or the server 108. The processor 120 of the electronic device 101 may map the acquired gesture information and corresponding reference data and store in the memory 130.

According to various embodiments, the processor 120 may present a plurality of requests for defining one gesture in order to increase a reliability of reference data. As a user performs a plurality of gestures in response to the plurality of requests, the processor 120 acquires a plurality of recording data on one gesture, and may learn feature information extracted from each of the plurality of recording data and provide reference data for the one gesture.

Referring to FIG. 2, at least one reference data corresponding to each of at least one gesture input 10 defined in the electronic device 101 may be stored in the memory 130. In some embodiments, the reference data is stored together with information of a function 15 (or operation/action) that is executable when the corresponding gesture input 10 is provided (and/or detected). In this regard, when acquiring recording data of a user gesture according to the request, the processor 120 may control a display device (e.g., the display device 160 of FIG. 1) and present a list. For example, the processor 120 may present a list enumerating at least one function that may be mapped to the gesture corresponding to the acquired recording data. The processor 120 may map information about a function selected on the list by a user input (e.g., a touch input or a touch gesture input by a part (one finger) of a user's body), with reference data provided (or having been provided) for a corresponding gesture, and store in the memory 130.

According to an embodiment, the at least one function presented in the list may be related to the management of a specific application included in the electronic device 101. For example, the at least one function may be related to the management of a camera application, and may support editing at least a part of a recorded video while recording the video (e.g., a moving picture) by using the camera module 180 driven according to the execution of the camera application.

According to various embodiments, at least one gesture input 10 defined in the electronic device 101 and at least one of the functions 15 corresponding (or mapped) to the at least one gesture input 10 may be defined as a default, prior to user's intervention (e.g., response to a request related to the definition of a gesture, or function selection on a list presented).

Referring to an example of the gesture input 10 defined in the electronic device 101 and the corresponding function 15, when receiving (or detecting) a pinch gesture input by a part of a user's body, the processor 120 may control zoom-in or zoom-out of a recorded video, based on function information mapped to reference data of the pinch gesture input. For another example, when receiving a rotation gesture (e.g., drawing a counterclockwise circle) input by a part (e.g., one finger) of the user's body, the processor 120 may calculate a speed or number of rotations of the rotation gesture input, and control rewinding a recorded video to a time range corresponding to the calculated speed or number of rotations, based on the function information mapped to the rotation gesture input. For further example, when receiving a single clap gesture input by a part (e.g., both hands) of the user's body, the processor 120 may control the pause of a recorded video or the restart of recording of the paused video, based on function information mapped to reference data of the single clap gesture input. However, the gesture input applicable to various embodiments of the present invention is not limited as described above, and in addition to this, may support other gesture inputs proposed in FIG. 2 or various other types of gesture inputs that may be implemented by a user motion, which may not be depicted herein.

Figure 3:
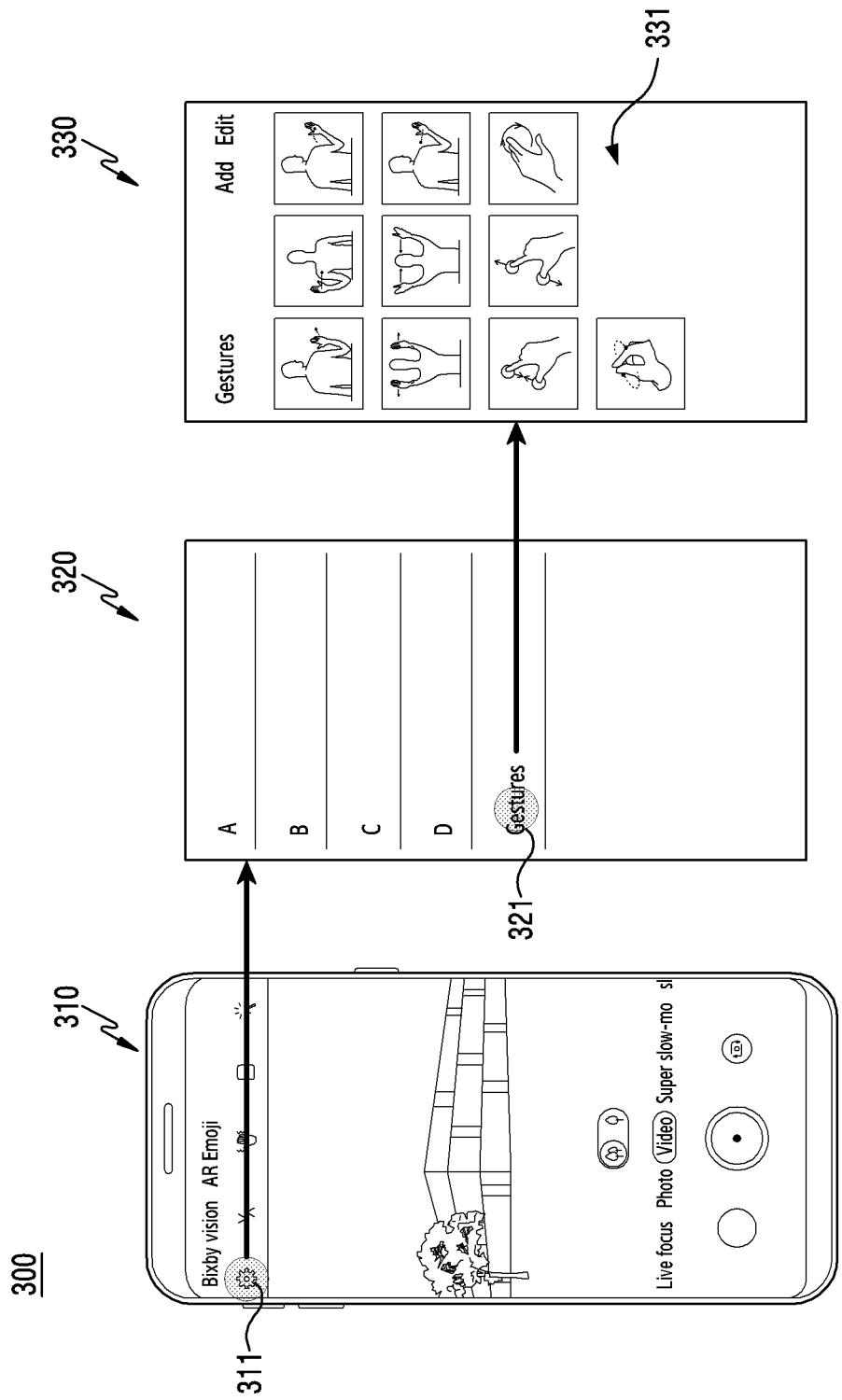
FIG. 3 is a diagram illustrating a user interface of visually presenting various gesture inputs recognizable by an electronic device according to an embodiment.

Referring to FIG. 3, a processor (e.g., the processor 120 of FIG. 1) of an electronic device 300 (e.g., the electronic device 101 of FIG. 1) may visually present at least one gesture input defined in the electronic device 300. In this regard, the processor 120 may present a setting menu 311 on an execution screen 310 of a camera application when the camera application is executed, and may display a setting screen 320 including a gesture menu 321 in response to reception (or detection) of a user input (e.g., a touch input or a touch gesture input by a part (one finger) of a user's body). In an embodiment, when receiving a user input on the gesture menu 321 in the setting screen 320, the processor 120 may display a gesture guide screen 330 visually indicating at least one gesture input defined in the electronic device 300.

According to an embodiment, the gesture guide screen 330 may include at least one thumbnail 331 indicating at least a part of a user motion related to the at least one gesture input. According to various embodiments, the at least one thumbnail 331 may be provided by extracting a specific video (or frame) from a recorded video including a user motion related to a gesture input. For example, the processor 120 may provide the thumbnail 331 by using a video corresponding to a time point at which a corresponding gesture input is recognized (or detected) among recorded videos including a user motion related to the gesture input. Or, the processor 120 may provide the thumbnail 331 by using a video corresponding to a time point when a specified time elapses from recognition (or detection) of a corresponding gesture input among recorded videos including a user motion related to the gesture input.

In various embodiments, the processor 120 may receive a user input for selecting a first thumbnail among the at least one thumbnail 331, and may display a pop-up window (not shown) in response thereto. The pop-up window may, for example, include at least one of an image, a video, a text, and an animation for guiding information of a first gesture input related to a first thumbnail selected by a user input and function information mapped to the first gesture input.

Figure 4:
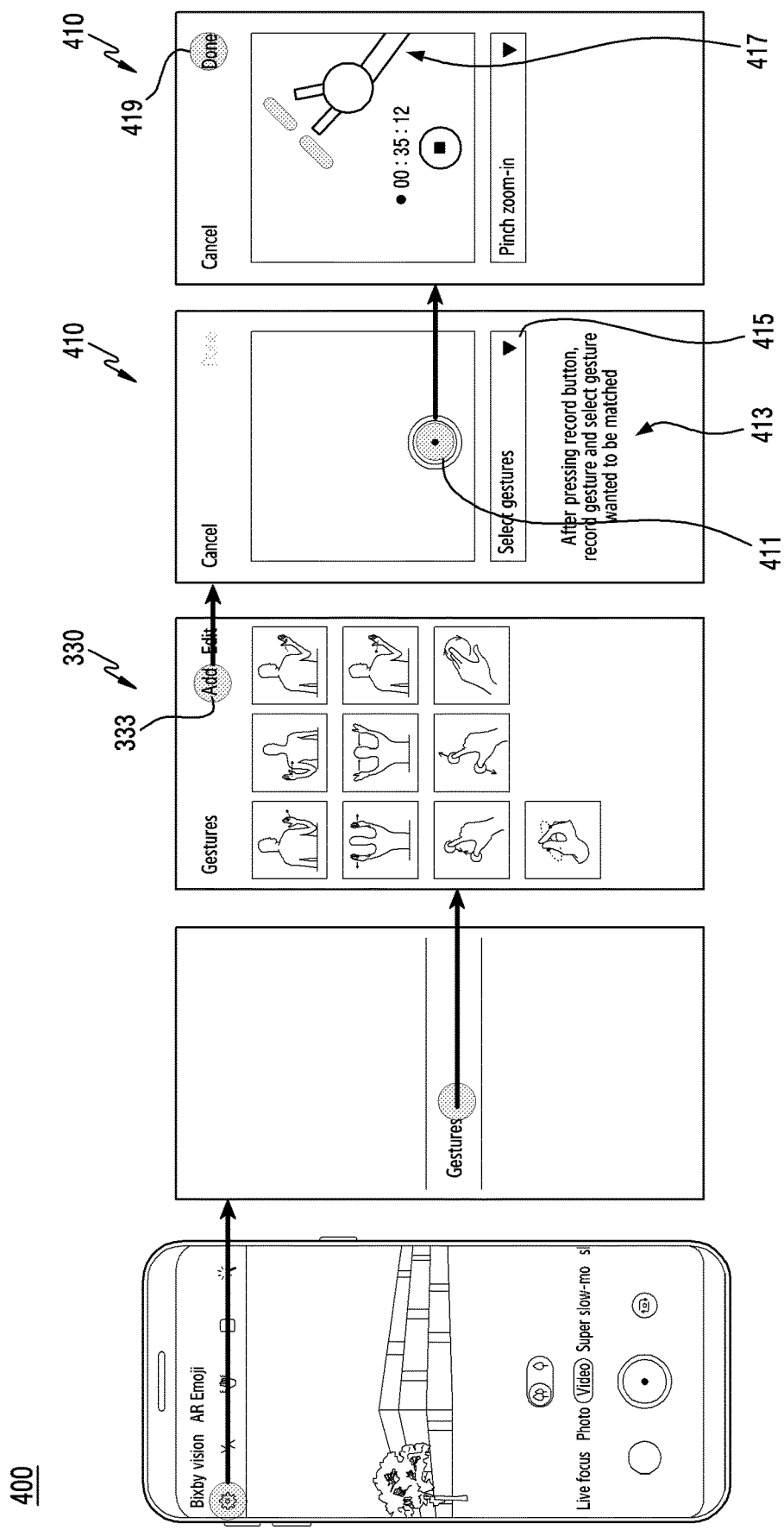
FIG. 4 is a diagram illustrating an example of additionally defining various gesture inputs recognizable by an electronic device according to an embodiment.

Referring to FIG. 4, a processor (e.g., the processor 120 of FIG. 1) of an electronic device 400 (e.g., the electronic device 101 of FIG. 1) may additionally define at least one gesture input other than the at least one gesture input defined in the electronic device 400, based on a user input. In this regard, the gesture guide screen 330 described above with reference to FIG. 3 may present an additional menu 333 supporting addition of the other at least one gesture input. When receiving (or detecting) a user input (e.g., a touch input or a touch gesture input by a part (one finger) of a user's body) on the additional menu 333, the processor 120 may switch the gesture guide screen 330, for example, to an execution screen 410 of a camera application that supports the photographing (e.g., selfie photographing) of the front or rear of the electronic device 400.

According to an embodiment, the execution screen 410 of the camera application may include a button 411 for controlling the start of a video-recording operation, i.e., recording a video (e.g., a moving picture), a text 413 for guiding the addition of the other at least one gesture input, and a slide menu 415 for selecting a function to be mapped to a gesture input to be added. In an embodiment, when receiving a user input for selecting a specific function and a user input on the button 411 through the slide menu 415, the processor 120 may start recording a video (e.g., a selfie-based moving picture) and acquire recording data including a user motion 417 related to the gesture input to be added.

In an embodiment, the processor 120 may present a completion menu 419 on the execution screen 410 of the camera application in response to the start of recording the video, and upon receiving a user input on the completion menu 419, may analyze the acquired recording data. For example, the processor 120 may extract feature information from the acquired recording data and provide reference data for recognizing a gesture corresponding to the user motion 417, and may map information on a function selected from the slide menu 415 and the provided reference data and store in a memory (e.g., the memory 130 of FIG. 1). According to various embodiments, when an additional gesture input is defined (e.g., reference data and function information are stored), the processor 120 may provide a thumbnail related to the added gesture input and reflect the same on the gesture guide screen 330.

According to various embodiments, in response to a user input, the processor 120 may edit at least a part of at least one gesture input defined in the electronic device 400 as well. In this regard, the gesture guide screen 330 may include an editing menu (e.g., edit) supporting the editing of the at least one gesture input. Upon receiving a user input on the editing menu, the processor 120 may present a selection box to each of at least one thumbnail included in the gesture guide screen 330. In response to receiving a user input on the selection box, the processor 120 may remove reference data of a gesture input related to a thumbnail of the corresponding selection box, and corresponding function information, from the memory 130.

Figure 5:
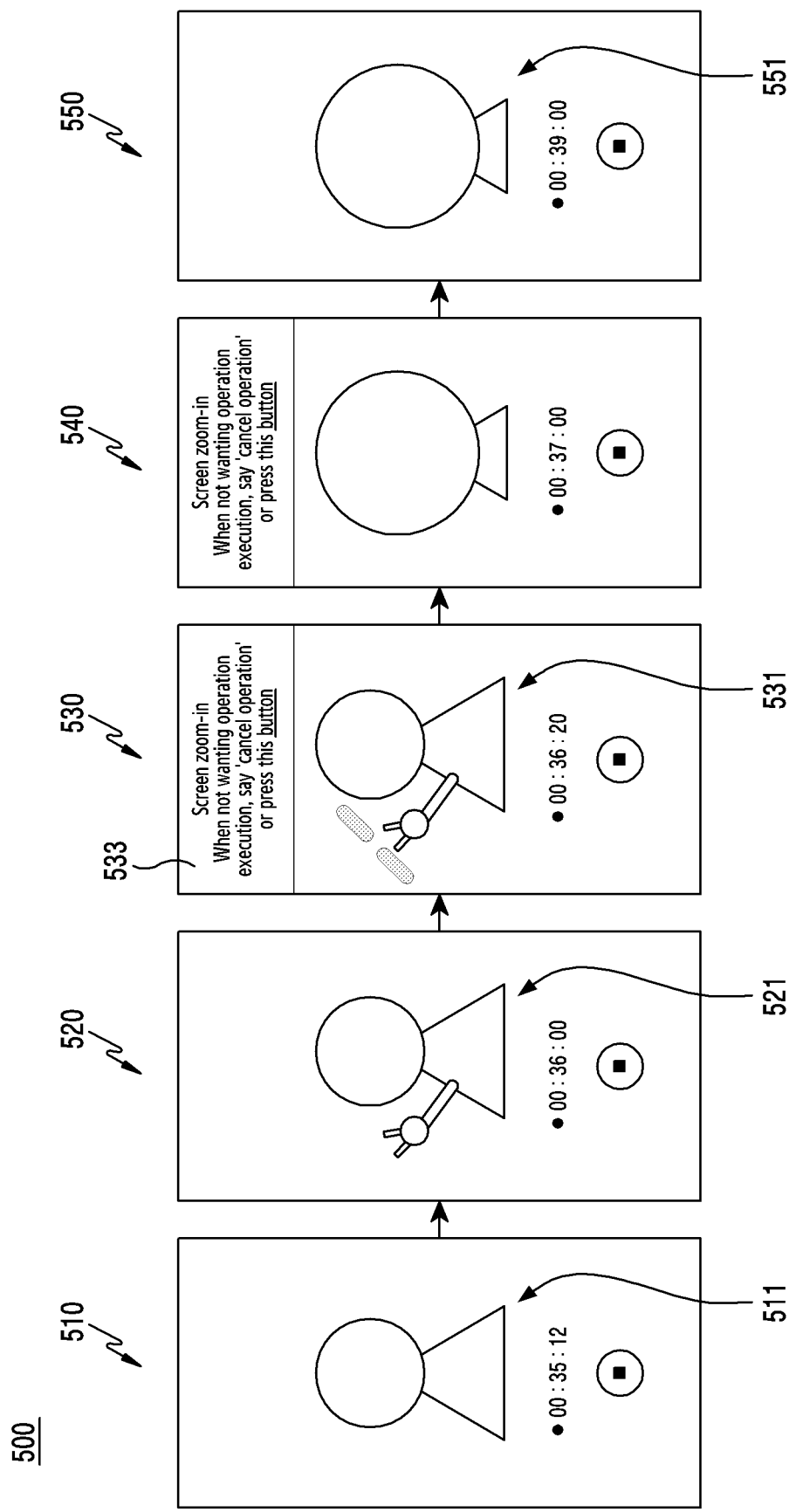
FIG. 5 is a diagram illustrating an example in which an electronic device recognizes a gesture input and executes a function according to an embodiment.
Figure 6:
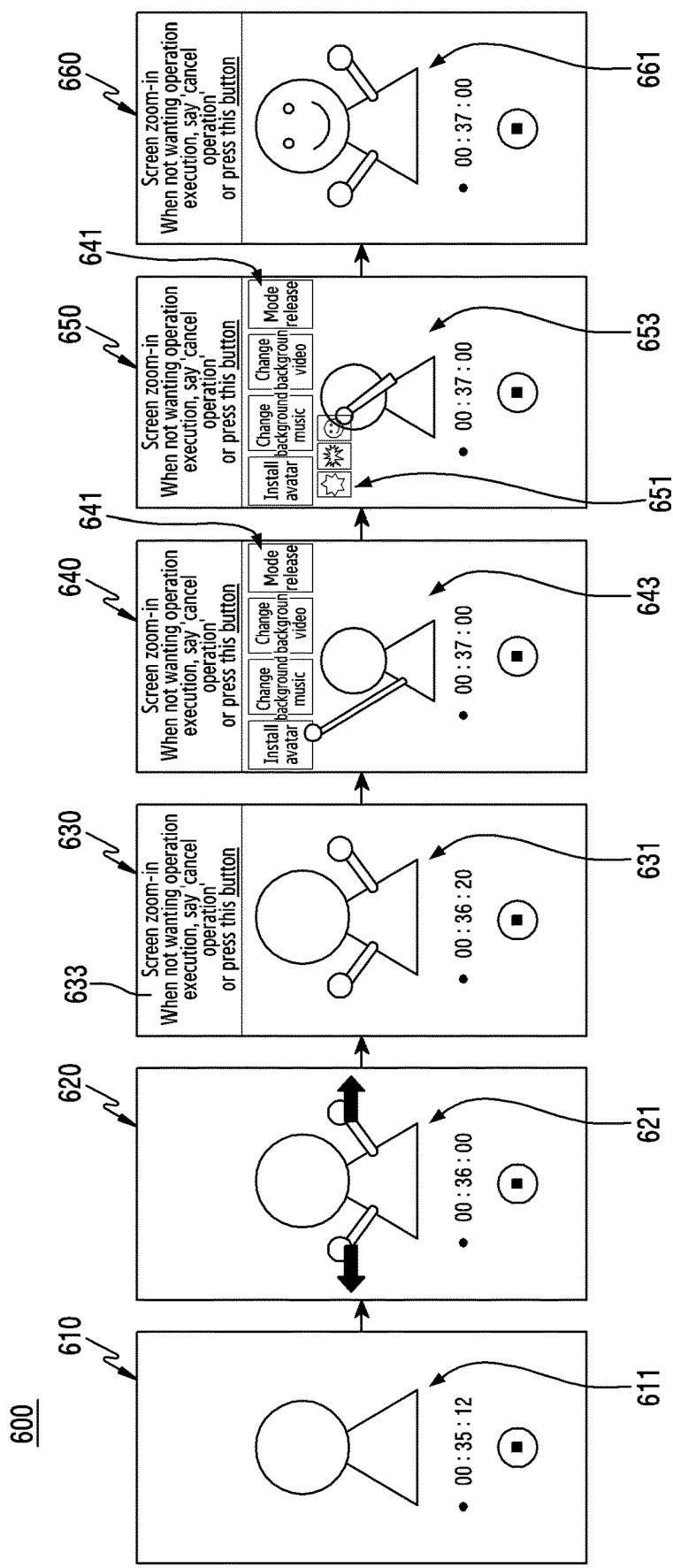
FIG. 6 is a diagram illustrating another example in which an electronic device recognizes a gesture input and executes a function according to an embodiment.
Figure 7:
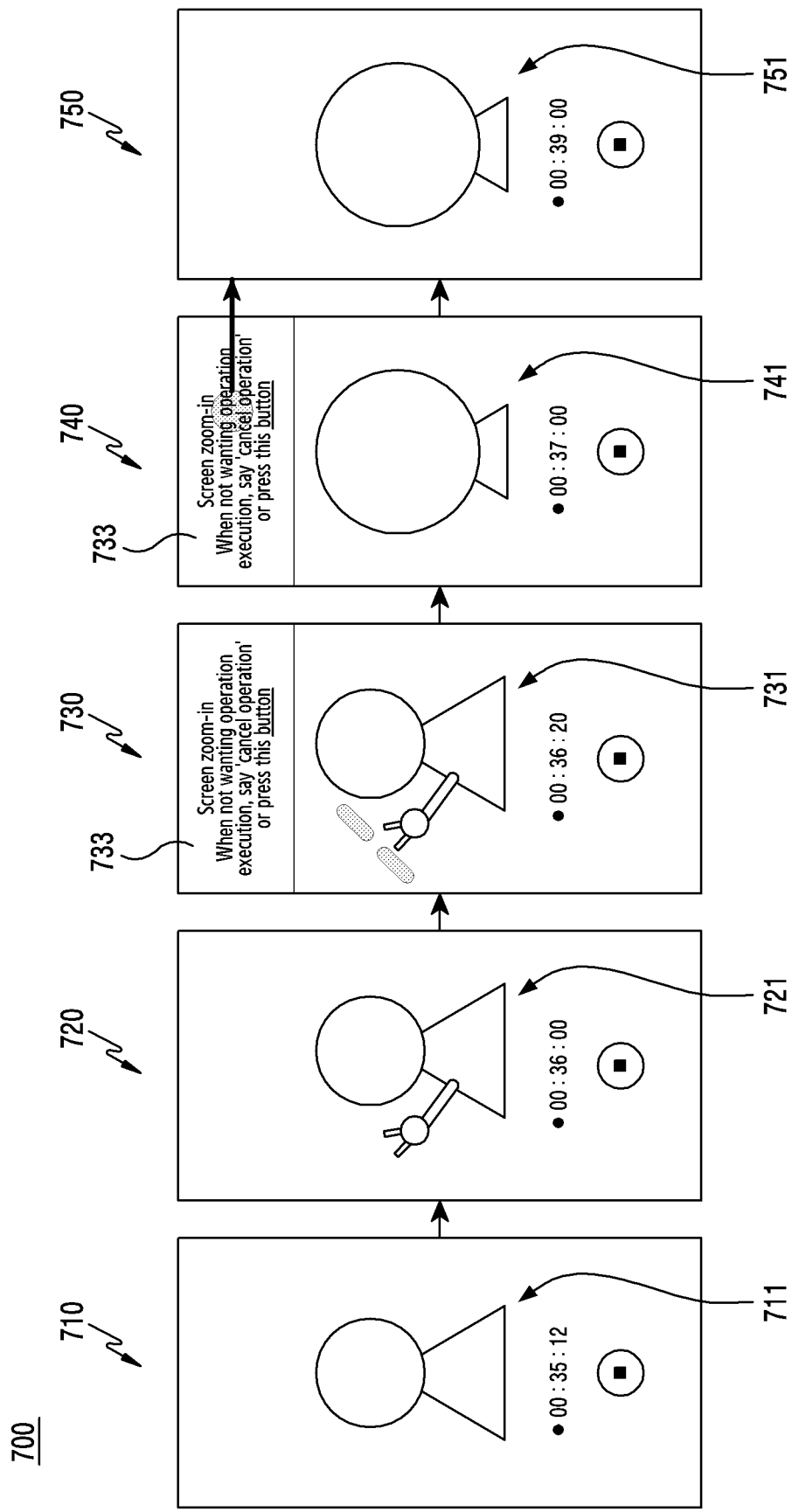
FIG. 7 is a diagram illustrating an example of restoring a function executed by an electronic device according to an embodiment.

FIG. 5 is a diagram illustrating an example in which an electronic device recognizes a gesture input and executes a function according to an embodiment; FIG. 6 is a diagram illustrating another example in which the electronic device recognizes a gesture input and executes a function according to an embodiment; and FIG. 7 is a diagram illustrating an example of restoring a function executed by the electronic device according to an embodiment.

According to an embodiment, consider an operation of acquiring recording data related to a video (e.g., a selfie-based moving picture) being recorded by the front or rear of the electronic device 101. The recording data is acquired by using a camera module (e.g., the camera module 180 of FIG. 1), and a processor (e.g., the processor 120 of FIG. 1) of the electronic device (e.g., the electronic device 101 of FIG. 1). In an embodiment, the processor detects a gesture input specified (or predefined in the electronic device 101), based on at least a part of the acquired recording data. The processor may execute a function corresponding (or mapped) to the detected gesture input.

In a description of an example of function execution performed in a video recording operation with reference to FIG. 5, the processor 120 of the electronic device 500 may control the camera module 180 at a first time point 510 to start recording of a video based on a motion of at least a part 511 of a user's body. Alternatively, the camera module 180 may maintain the recording of a video starting from before the first time point 510.

At a second time point 520 after the first time point 510, the processor 120 may record a video including a user motion 521. Based on a change of the acquired recording data, the user motion 521 is recognized. In this case, the processor 120 may analyze the recording data related to the user motion 521 and determine whether the user motion 521 is related to at least one gesture input defined in the electronic device 500. For example, the processor 120 may compare the recording data related to the user motion 521 with at least one reference data that is stored in the memory 130 so as to recognize a gesture input, and may determine matching (or corresponding) or non-matching between the user motion 521 from the recording data and the reference data.

In an embodiment, when the reference data matching with the recording data related to the user motion 521 does not exist in the memory 130 (e.g., when a matching ratio between the recording data and the reference data is less than 20%), the processor 120 may continuously perform video recording without separate control.

In an embodiment, when reference data partially matching (e.g., matching within a specified ratio range) with the recording data related to the user motion 521 exists in the memory 130 (e.g., when the matching ratio between the recording data and the reference data is equal to or more than 20% and less than 60%), the processor 120 may load, to a memory (e.g., the volatile memory 132 of FIG. 1), at least one command or data required for executing a function mapped to the corresponding reference data. For example, when the user motion 521 is linked to a gesture input and the gesture input is recognized, the processor 120 may preload, to the memory, at least a part of the at least one command or data related to the execution of the function, so as to reduce a time required for executing a function related to the gesture input.

According to an embodiment, at a third time point 530 after the second time point 520, the processor 120 may record a video including a user motion 531 related to a predefined gesture input (e.g., a gesture of pinching with two fingers). In this regard, the processor 120 may compare recording data related to the user motion 531 with at least one reference data, similar to the operation at the second time point 520 described above. According to an embodiment, the recording data related to the user motion 531 may match with specific reference data among the at least one reference data by a specified ratio or more (e.g., 80% or more), and the processor 120 may recognize the user motion 531 as a gesture input, based on the comparison result. According to an embodiment, in response to recognizing (or detecting) the gesture input, the processor 120 may check function (e.g., screen zoom-in) information mapped to reference data of the recognized gesture input, and may present a specified button 533 in one region of a display device (e.g., the display device 160 of FIG. 1). For example, the processor 120 may present the button 533 supporting the undoing of the checked function, and the button 533 may include at least one of an image, a video, a text, and an animation related to information (e.g., screen zoom-in) about a function to be executed and information (e.g., say 'cancel the operation' or press this button if you do not want to execute the operation) guiding the undoing of the corresponding function. According to an embodiment, when receiving a user input on the button 533 (e.g., a touch input on the button 533 or a voice input following a specified utterance (cancel the operation)), the processor 120 may continue recording the video without executing the checked function.

According to an embodiment, at a fourth time point 540 when a specified time elapses after the button 533 is presented, the processor 120 may execute the function (e.g., screen zoom-in) mapped to the reference data of the recognized gesture input. In this operation, the processor 120 may execute the function by processing at least one command or data preloaded to the memory (e.g., the volatile memory 132 of FIG. 1). Or, when a function to be executed is different from a function related to at least one command or data preloaded to the memory 132, the processor 120 may execute the function by loading at least one other command or data related to the function to be executed to the memory 132 and processing. According to various embodiments, the processor 120 may omit the presenting of the button 533, and execute the function corresponding to the recognized gesture input at the third time point 530 when the user motion 531 is recognized as the gesture input as well.

At a fifth time point 550 after the fourth time point 540, the processor 120 may continue the recording of a video that is based on the executed function. For example, while maintaining the execution of the function, the processor 120 may record a video including at least a part 551 of a user's body, or record a video including an arbitrary subject.

Referring to FIG. 6, a processor (e.g., the processor 120 of FIG. 1) of the electronic device 600 may start or maintain the recording of a video including at least a part 611 of a user's body at a first time point 610. The embodiment may further record a video including a user motion 621 at a second time point 620 after the first time point 610. The processor 120 may compare recording data related to the user motion 621 with at least one reference data for recognizing at least one gesture input defined in the electronic device 600. According to an embodiment, as the recording data related to the user motion 621 does not match with the at least one reference data (e.g., a matching ratio is less than 20%), the processor 120 may continuously perform the video recording. As the recording data partially matches with specific reference data (e.g., matches within a specified ratio range (equal to or more than 20% and less than 60%)), the processor 120 may load at least one command or data related to the execution of a function mapped to the specific reference data, to a memory (e.g., the volatile memory 132 of FIG. 1).

According to an embodiment, at a third time point 630 after the second time point 620, the processor 120 may record a video including a user motion 631 related to a gesture input (e.g., a gesture of opening both arms) defined in the electronic device 600. The processor 120 may compare recording data related to the user motion 631 with at least one reference data, and according as the recording data matches with specific reference data among the at least one reference data by a specified ratio or more (e.g., 80% or more), the processor 120 may recognize the user motion 631 as a gesture input. In response to recognizing (or detecting) of the gesture input, the processor 120 may check function (e.g., video effect) information mapped to reference data of the recognized gesture input, and may present a button 633 supporting the undoing of the checked function in one region of a display device (e.g., the display device 160 of FIG. 1).

According to an embodiment, at a fourth time point 640 when a specified time elapses after the button 633 is presented, the processor 120 may execute a function (e.g., video effect) related to the recognized gesture input. For example, as part of executing the function, the processor 120 may present at least one object 641 capable of editing (e.g., selecting, changing, or releasing) an effect (e.g., an avatar, a background music, or a background video) on a video, in another region (e.g., a region under the button 633) of the display device 160. According to various embodiments, the processor 120 may omit the presenting of the button 633, and execute a function at the third time point 630 at which the gesture input is recognized, and present the at least one object 641 in an arbitrary region of the display device 160 as well.

According to an embodiment, the processor 120 may detect a motion 643 of a user input (e.g., a touch input or a touch gesture input by a part (one finger) of a user's body) for selecting a specific object among the at least one object 641. In response to receiving (or detecting) of the user input, at a fifth time point 650 after the fourth time point 640, the processor 120 may present at least one candidate group object 651 related to the selected object. When a motion 653 of a user input for selecting a specific candidate group object is detected, the processor 120 may check information on a function (e.g., displaying an avatar image on a video) related to a corresponding candidate group object.

According to various embodiments, an operation performed by the processor 120 at the fifth time point 650 may be omitted according to an object selected from the user input at the fourth time point 640. For example, when an object related to the release of a video effect (e.g., mode release) is selected from among the at least one object 641 at the fourth time point 640, an operation performed by the processor 120 at the fifth time point 650 may be omitted.

At a sixth time point 660 after the fifth time point 650 (or the fourth time point 640), the processor 120 may, as another part of function execution, execute a function of applying an effect (e.g., an avatar effect) selected by a user input to a video. Alternatively, the processor 120 may execute a function of releasing an existing applied effect, and record a video including the at least part 611 of the user's body or a video including an arbitrary subject, based on the executed function (e.g., effect apply or effect release).

Referring to FIG. 7, each of the operations (e.g., starting or maintaining the recording of a video including at least a part 711 of a user's body) of a first time point 710 performed by a processor (e.g., the processor 120 of FIG. 1) of the electronic device 700 and an operation (e.g., recording a video including a user motion 721) of a second time point 720 may correspond to each of the operation of the first time point 510 and the operation of the second time point 520 described above with reference to FIG. 5, and a duplicate description may be omitted.

In an embodiment, at a third time point 730 after the second time point 720, the processor 120 may record a video including a user motion 731, the user motion 731 being related to a predefined gesture input (e.g., a gesture of pinching with two fingers). The processor 120 may compare the recording data related to the user motion 731 with at least one reference data, and may recognize the user motion 731 as a gesture input in response to the recording data matching with specific reference data by a specified ratio or more (e.g., 80% or more). According to an embodiment, in response to the recognizing (or detecting) of the gesture input, the processor 120 may present a button 733 supporting the undoing of a function (e.g., screen zoom-in) mapped to reference data of the recognized gesture input, in one region of a display device (e.g., the display device 160 of FIG. 1).

According to an embodiment, the processor 120 may measure and note a time elapsed after (since) the button 733 is presented. When a user input (e.g., a touch input or a touch gesture input by a part (one finger) of a user's body) on the button 733 is received (or detected) before a specified time elapses, the processor 120 may not execute the function mapped to the reference data of the recognized gesture input. At a fifth time point 750 after the third time point 730, the processor 120 may record a video including at least a part 751 of the user's body or an arbitrary subject, without executing the function related to the gesture input.

According to another embodiment, the processor 120 may not receive (or detect) a user input on the button 733 until a specified time elapses after the button 733 is presented. In this case, at a fourth time point 740 after the third time point 730, the processor 120 may execute the function (e.g., screen zoom-in) mapped to the reference data of the recognized gesture input. Accordingly, the processor 120 may record a video including at least a part 741 of the user's body or an arbitrary subject, based on the executed function. According to an embodiment, the processor 120 may count (measure) a time elapsed since the execution of the function, and may receive (or detect) a user input on the button 733 before a specified time elapses. In this case, the processor 120 may restore (e.g., undo) the executed function and, at the fifth time point 750 after the fourth time point 740, the processor 120 may record a video including the at least part 751 of the user's body or the arbitrary subject, without executing the function related to the gesture input.

Figure 9:
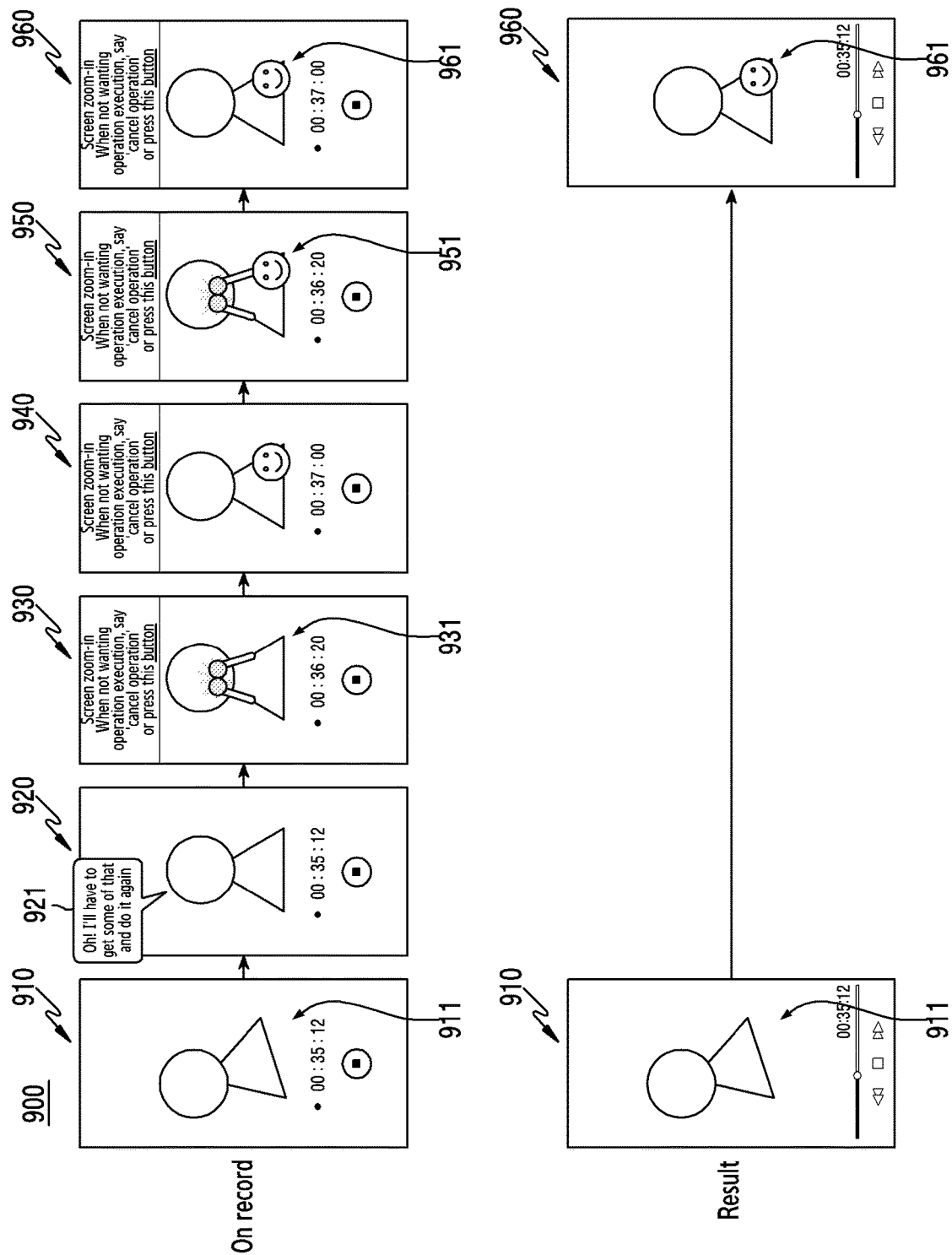
FIG. 9 is a diagram illustrating another example of excluding a gesture input from a recorded video according to an embodiment.
Figure 10:
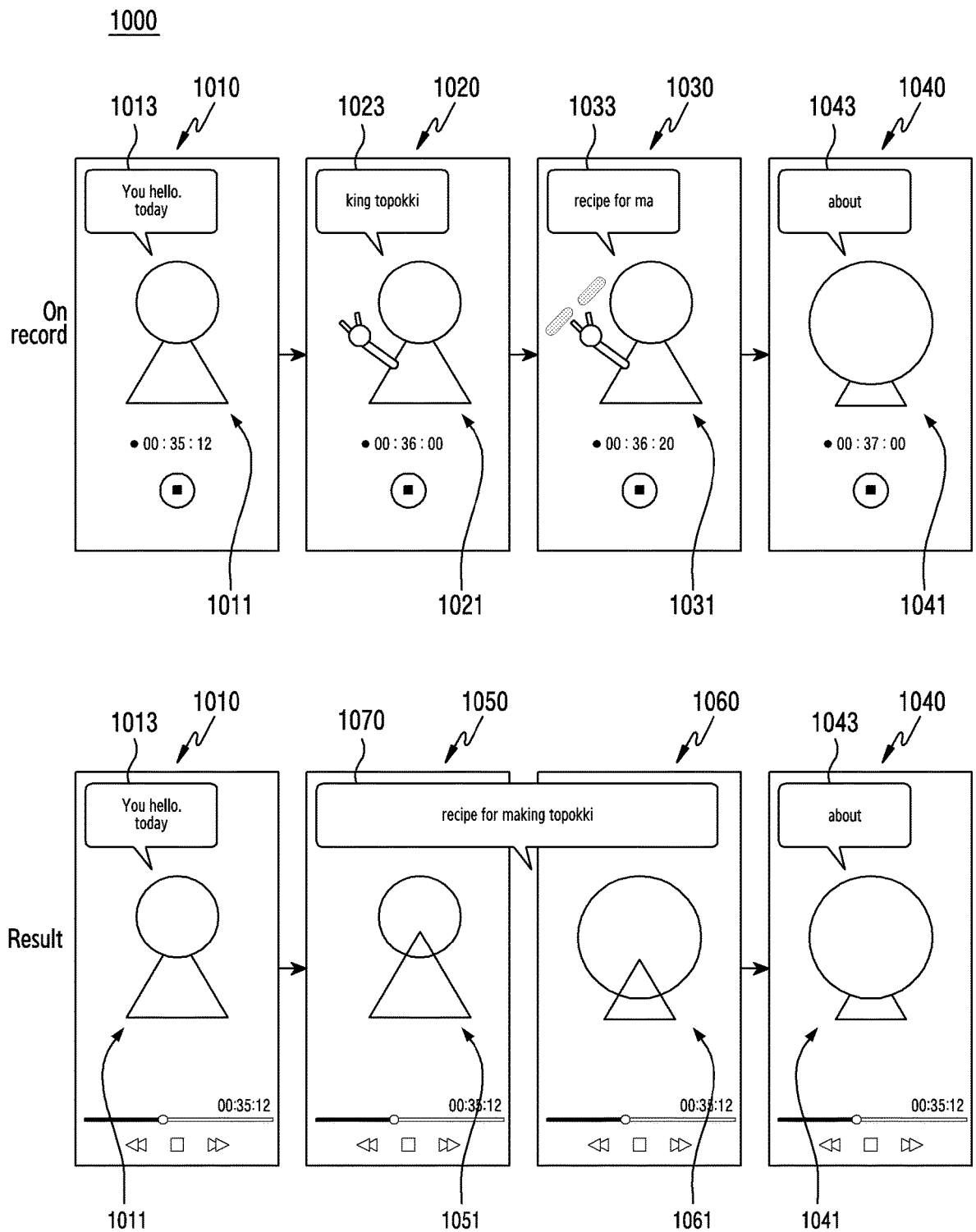
FIG. 10 is a diagram illustrating a further example of excluding a gesture input from a recorded video according to an embodiment.

FIG. 8 is a diagram illustrating an example of excluding a gesture input from a recorded video according to an embodiment, FIG. 9 is a diagram illustrating another example of excluding a gesture input from a recorded video according to an embodiment, and FIG. 10 is a diagram illustrating a further example of excluding a gesture input from a recorded video according to an embodiment.

In an embodiment, in an operation of performing video recording and acquiring first recording data, when at least one gesture input predefined in the electronic device 101 is recognized (or detected/identified), a processor (e.g., the processor 120 of FIG. 1) of an electronic device (e.g., the electronic device 101 of FIG. 1) may exclude partial recording data from the first recording data. For example, the processor 120 may exclude, from the first recording data, partial recording data corresponding to a time interval from a recognition (or detection/identification) initiation time point of the gesture input to a recognition (or detection/identification) termination time point, wherein a video viewer cannot intuitively recognize the gesture input (or a user motion related to the gesture input) when the first recording data is reproduced. The processor 120 may store second recording data excluding partial data from the first recording data, in a memory (e.g., the non-volatile memory 134 of FIG. 1). Also, the processor 120 may store partial data excluded from the first recording data in the memory (e.g., the volatile memory 132 of FIG. 1), or store the same in a separate cache memory included in the electronic device 101.

In various embodiments, the processor 120 may further exclude other partial recording data from the first recording data, together with the exclusion of the partial recording data. Hereinafter, various embodiments in which the other partial recording data is further excluded may be described with reference to FIG. 8, FIG. 9, and FIG. 10.

Referring to FIG. 8, a processor 120 of an electronic device 800 may start or maintain the recording of a video including at least a part 811 of a user's body at a first time point 810, and may record a video including a user motion 821 at a second time point 820 after the first time point 810. In an embodiment, the processor 120 may compare recording data related to the user motion 821 with at least one reference data, and may determine that the recording data related to the user motion 821 may partially match with specific reference data (e.g., match within a specified ratio range (equal to or more than 20% and less than 60%). The processor 120 may continue the video recording in response to the recording data related to the user motion 821 not matching with at least one reference data by a specified ratio or more (e.g., 80% or more) The processor 120 may record a video including a user motion 831 related to at least one gesture input (e.g., a gesture of pinching with two fingers) defined in the electronic device 800 at a third time point 830 after the second time point 820. The processor 120 may recognize (or detect/identify) the user motion 831 as a gesture input, based on a comparison between the recording data related to the user motion 831 and at least one reference data. In response to the recognizing (or detecting/identifying) of the gesture input, the processor 120 may execute a function (e.g., screen zoom-in) related to the recognized gesture input at a fourth time point 840 after the third time point 830, and may record a video including at least a part 841 of the user's body or an arbitrary subject, based on the executed function.

According to an embodiment, the processor 120 may exclude, from the first recording data acquired according to the recording of the video, recording data corresponding to a time interval from a recognition initiation time point of the gesture input recognized (or detected) at the third time point 830 to a recognition termination time point. In this operation, the processor 120 may further exclude, from the first recording data, recording data of the user motion 821 partially matching with specific reference data determined at the second time point 820 (e.g., matching within a specified ratio range (equal to or more than 20% and less than 60%). For example, the processor 120 may further exclude recording data corresponding to a time interval from an acquisition initiation time point of the recording data of the user motion 821 to a recognition (or detection/identification) initiation time point of the gesture input. In this regard, because it is determined that the recording data of the user motion 821 recorded at the second time point 820 partially matches with the specific reference data (e.g., matches within the specified ratio range (equal to or more than 20% and less than 60%), the processor 120 may determine the user motion 821 as a preceding motion linked to the gesture input (e.g., a motion of opening two fingers in a clenched first state for a pinch gesture, or a motion in which a user's body with the opened two fingers enters a video). The processor 120 may further exclude, from the first recording data, recording data corresponding to a time interval from an acquisition initiation time point of the recording data of the user motion 821 to a recognition (or detection) initiation time point of the gesture input, wherein the video viewer cannot recognize the preceding motion when the first recording data is reproduced.

Similarly to the above, when acquiring recording data of a user motion partially matching with specific reference data (e.g., matching within a specified ratio range (equal to or more than 20% and less than 60%)) at a fifth time point between the third time point 830 and the fourth time point 840, the processor 120 may determine the user motion as a subsequent motion linked from the gesture input. The processor 120 may further exclude, from the first recording data, recording data corresponding to a time interval from a recognition (or detection/identification) termination time point of the gesture input to an acquisition termination time point of recording data of a user motion of the fifth time point.

According to various embodiments for excluding partial recording data of a gesture input from recording data of a video, the processor 120 may further exclude, from the first recording data, recording data recorded within a first time range (e.g., a time range corresponding to before a recognition initiation time point of the gesture input) that is specified with a criterion of the recognition (or detection) initiation time point of the gesture input, and recording data recorded within a second time range (e.g., a time range corresponding to after a recognition termination time point of the gesture input) that is specified with a criterion of the recognition (or detection) termination time point of the gesture input. Or, the processor 120 may further exclude, from the first recording data, recording data corresponding to the first number of previous frames that are specified with a criterion of the recognition (or detection) initiation time point of the gesture input, and recording data corresponding to the second number (e.g., the same number as the first number) of subsequent frames that are specified with a criterion of the recognition (or detection) termination time point of the gesture input.

Referring to FIG. 9, a processor (e.g., the processor 120 of FIG. 1) of the electronic device 900 may start or maintain the recording of a video including at least a part 911 of a user's body at a first time point 910, and may receive a specified utterance 921 (e.g., an utterance including a specified exclamation) at a second time point 920 after the first time point 910. Or, the processor 120 may receive a daily utterance not having a separate restriction at the second time point 920 as well.

According to an embodiment, the processor 120 may record a video including a user motion 931 related to a first gesture input (e.g., one clap gesture) defined in the electronic device 900, at a third time point 930 within a specified time range from the second time point 920, and may recognize (or detect) the first gesture input, based on a comparison between recording data related to the user motion 931 and reference data.

According to various embodiments, receiving the utterance 921 at the second time point 920 and acquiring the recording data related to the user motion 931 at the third time point 930 may be performed at the same time point as well. For example, when a user utters while taking a motion related to the first gesture input at the third time point 930, the processor 120 may receive the utterance 921 at the third time point 930 and simultaneously acquire recording data related to the user motion 931.

In an embodiment, at a fourth time point 940 after the third time point 930, in response to the recognizing (or detecting) of the first gesture input, the processor 120 may execute a function related (or mapped) to the first gesture input (e.g., the pause of recording with a criterion of a time when the first gesture input was recognized (or detected)). At a fifth time point 950 when the execution of the function related to the first gesture input is maintained, the processor 120 may record a video including a user motion 951 related to a second gesture input (e.g., one clap gesture). According to an embodiment, the second gesture input and the preceding first gesture input may be gesture inputs mutually correlated, or defined to form a pair. The processor 120 may recognize (or detect) the second gesture input, based on recording data related to the user motion 951. At t a sixth time point 960, after the fifth time point 950, the processor 120 may execute a function (e.g., the restarting of recording with a criterion of a time at which the first gesture input correlated with the second gesture input was recognized (or detected)) related to the recognized second gesture input, and record a video including at least a part 961 of a user's body or an arbitrary subject.

According to an embodiment, the processor 120 may exclude, from the first recording data acquired according to the video recording, recording data corresponding to a time interval from a recognition (or detection) initiation time point of the first gesture input to a recognition (or detection) termination time point of the second gesture input. In this operation, the processor 120 may check the existence or non-existence of audio data of an utterance (e.g., a specified utterance 921 or a daily utterance) that is received at the same time as a recognition initiation time point of the first gesture input or within a time range that is specified with a criterion of the recognition initiation time point. In an embodiment, when the audio data acquired at the same time point as the recognition initiation time point of the first gesture input exists, the processor 120 may further exclude the audio data from the first recording data. Or, when the acquired audio data exists within the time range that is specified with a criterion of the recognition initiation time point of the first gesture input, the processor 120 may further exclude the audio data and recording data corresponding to a time interval from an acquisition initiation time point of the audio data to a recognition (or detection) initiation time point of the first gesture input.

Referring to FIG. 10, each of an operation of a first time point 1010 (e.g., starting or maintaining the recording of a video including at least a part 1011 of a user's body) performed by a processor (e.g., the processor 120 of FIG. 1) of the electronic device 1000, an operation of a second time point 1020 (e.g., recording a video including a user motion 1021), an operation of a third time point 1030 (e.g., recording a video including a user motion 1031 related to a predefined gesture input), and an operation of a fourth time point 1040 (e.g., recording a video including at least a part 1041 of the user's body based on the execution of a function related to a recognized gesture input) may correspond to each of the operation of the first time point 810, the operation of the second time point 820, the operation of the third time point 830, and the operation of the fourth time point 840 described above with reference to FIG. 8.

However, in an embodiment described with reference to FIG. 10, the processor 120 may perform an operation of receiving user utterances having a mutual correlation from the first time point 1010 to the fourth time point 1040. For example, the processor 120 may receive a first utterance 1013 at the first time point 1010, a second utterance 1023 at the second time point 1020, a third utterance 1033 at the third time point 1030, and a fourth utterance 1043 at the fourth time point 1040.

In an embodiment, the processor 120 may exclude, from first recording data acquired according to the video recording, recording data corresponding to a time interval from a recognition (or detection) initiation time point of a gesture input recognized at the third time point 1030 to a recognition (or detection) termination time point. Or, the processor 120 may further exclude recording data corresponding to a time interval from an acquisition initiation time point of recording data of the user motion 1021 partially matching with specific reference data at the second time point 1020 (e.g., matching within a specified ratio range (equal to or more than 20% and less than 60%)), to a recognition (or detection) initiation time point of the gesture input. In this operation, the processor 120 may not exclude audio data of an utterance received upon video recording, from the first recording data.

In an embodiment, by using second recording data excluding partial recording data from the first recording data, the processor 120 may provide third recording data that will be applied to sections 1050 and 1060 corresponding to the excluded recording data. For example, the processor 120 may apply a first effect 1051 (e.g., fade out) to partial data (e.g., at least a part of recording data acquired at the first time point 1010) among the second recording data, and apply a second effect 1061 (e.g., fade in) to other partial data (e.g., at least a part of recording data acquired at the fourth time point 1040) among the second recording data, and provide the partial data and the other partial data as the third recording data that is linked based on a transition effect.

According to an embodiment, the processor 120 may apply the provided third recording data to the second recording data. For example, the processor 120 may apply the third recording data to the sections 1050 and 1060 related to the partial recording data excluded from the first recording data among sections of the second recording data. In this operation, the processor 120 may adjust a rate of a plurality of frames included in the provided third recording data to be equal to a rate of a plurality of frames included in the excluded recording data. In this case, the provided third recording data may be linked, without interruption, with the second recording data (e.g., the recording data acquired at the first time point 1010 and the recording data acquired at the fourth time point 1040). Also, the processor 120 may provide, as one audio data 1070, audio data (e.g., audio data of the second utterance 1023 and audio data of the third utterance 1033) acquired at time points (e.g., the second time point 1020 and the third time point 1030) corresponding to the excluded recording data, and apply the same to the sections 1050 and 1060 of the second recording data.

Figure 11:
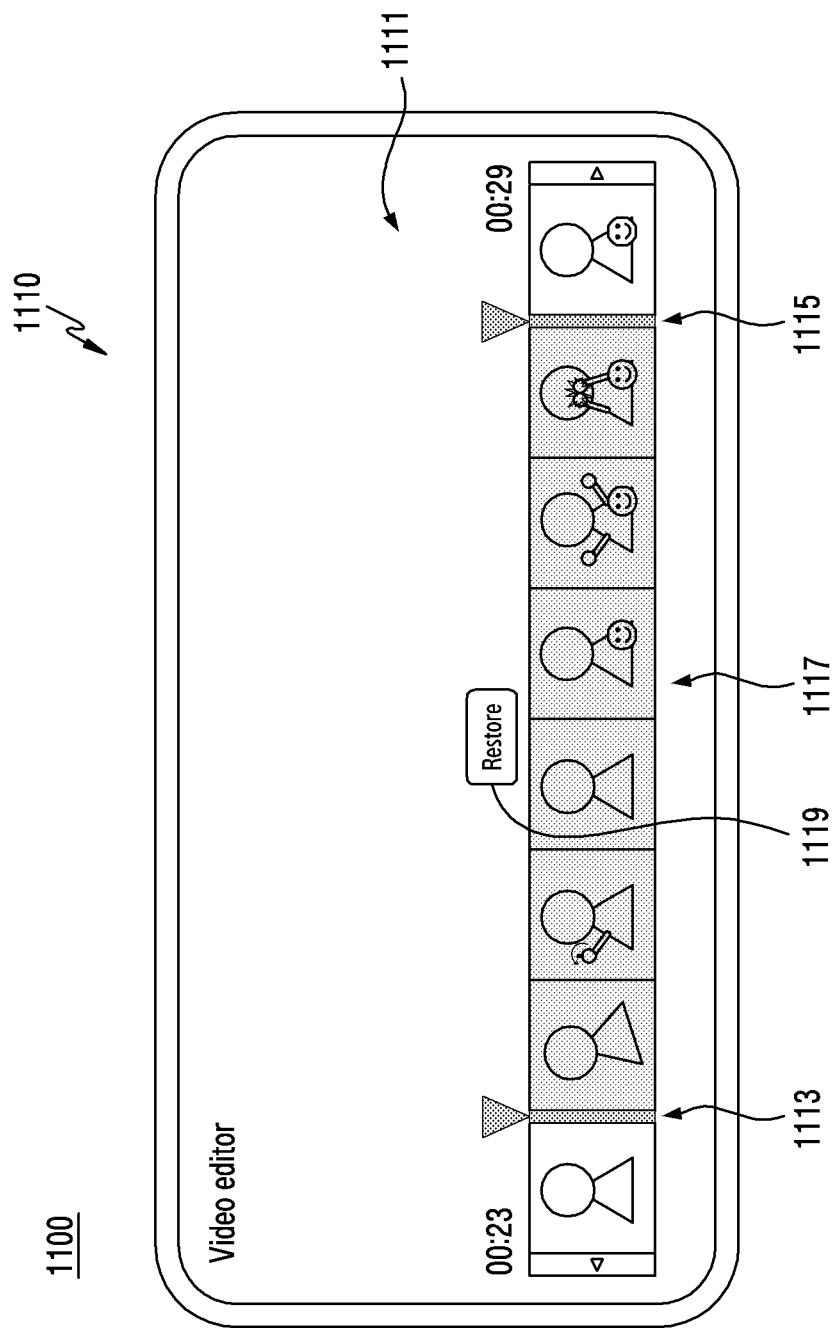
FIG. 11 is a diagram illustrating an example of post-editing a recorded video in an electronic device according to an embodiment.

FIG. 11 is a diagram illustrating an example of post-editing a recorded video in an electronic device according to an embodiment.

Referring to FIG. 11, at a time point of completing the recording of a video, a processor (e.g., the processor 120 of FIG. 1) of the electronic device 1100 may visually present a pre-editing state of recording data (e.g., a state of excluding partial data from the recording data) through a specified user interface 1110. For example, the processor 120 may present a first plurality of frames 1111 corresponding to a part of recording data, and the first plurality of frames 1111 may include a second plurality of frames 1117 corresponding to partial data excluded through pre-editing. In this regard, to support user's intuitive recognition of the second plurality of frames 1117, the processor 120 may process (e.g., dimming processing, blinking processing, or blur processing), through a specified display effect, the second plurality of frames 1117 corresponding to a time interval from an initiation time point 1113 of the excluded partial data to a termination time point 1115, and present.

According to an embodiment, the processor 120 may present a menu 1119 supporting the restoration of the excluded partial data (or the second plurality of frames 1117), in one region of the interface 1110. The processor 120 may receive (or detect) a user input (e.g., a touch input or a touch gesture input by a part (one finger) of a user's body) on the menu 1119, and in this case, may perform post-editing for restoring the recording data to a state prior to the pre-editing by using the partial data stored in a memory (e.g., the volatile memory 132 of FIG. 1). The processor 120 may store the post-edited recording data in a memory (e.g., the non-volatile memory 134).

Figure 12:
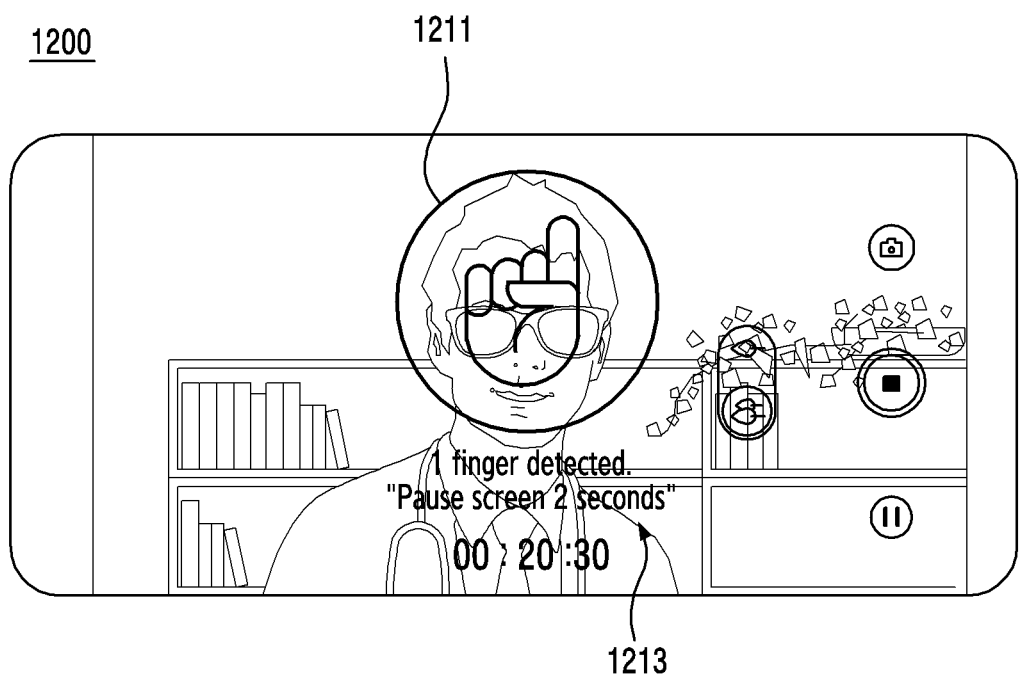
FIG. 12 is a diagram illustrating an example of guide information presented when a gesture input is recognized in an electronic device according to an embodiment.
Figure 13:
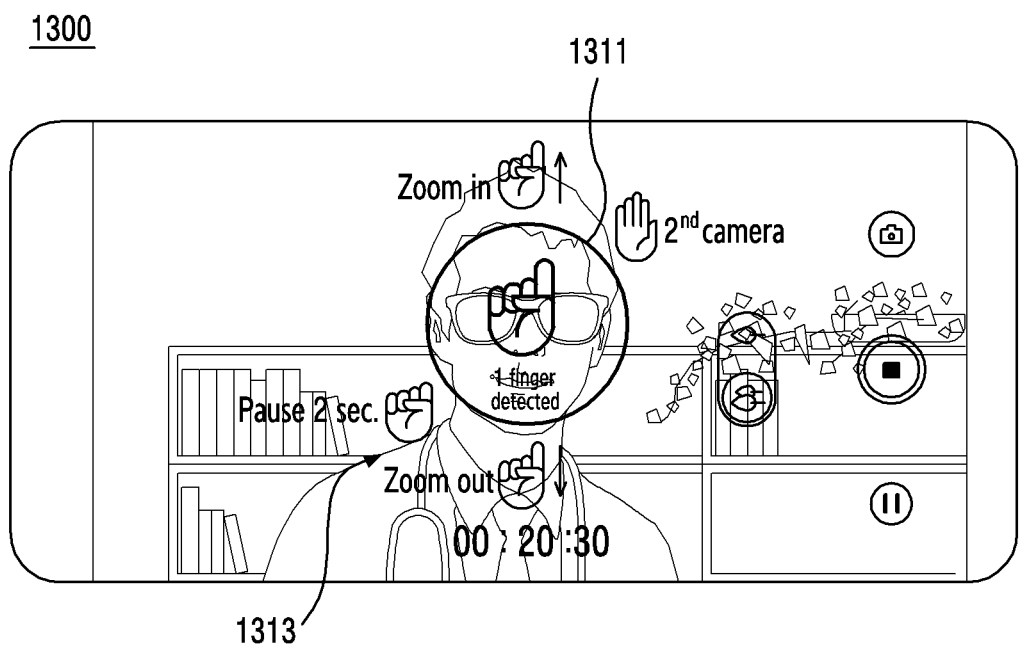
FIG. 13 is another example of guide information presented when a gesture input is recognized in an electronic device according to an embodiment.

FIG. 12 is a diagram illustrating an example of guide information presented when a gesture input is recognized in an electronic device according to an embodiment, and FIG. 13 is another example of guide information presented when a gesture input is recognized in the electronic device according to an embodiment.

Referring to FIG. 12, a processor (e.g., the processor 120 of FIG. 1) of the electronic device 1200 may recognize (or detect) at least one gesture input defined in the electronic device 1200 in an operation of recording a video. In this case, the processor 120 may present guide information about a corresponding gesture input, before executing a function mapped to the recognized gesture input (or mapped to reference data of the recognized gesture input). For example, the processor 120 may visually present guide information (e.g., an image, a video, a text, or an animation) including at least one of information 1211 indicating the recognized gesture input and information 1213 indicating a function related to the corresponding gesture input.

According to various embodiments, the guide information 1211 and/or 1213 may disappear after the lapse of a specified time, and the processor 120 may execute the function related to the recognized gesture input when the guide information 1211 and/or 1213 disappears. Or, when a user input (e.g., a touch input or a touch gesture input by a part (one finger) of a user's body) is provided on at least a part of the guide information 1211 and/or 1213, the guide information 1211 and/or 1213 may disappear, and when the guide information 1211 and/or 1213 disappears or when the user input is received (or detected), the processor 120 may execute the function related to the recognized gesture input.

Referring to FIG. 13, when recognizing (or detecting) a gesture that is partially similar to at least one gesture input defined in the electronic device 1300 (e.g., matches within a specified ratio range (equal to or more than 20% and less than 60%)), a processor (e.g., the processor 120 of FIG. 1) of the electronic device 1300 may present guide information about at least one gesture input that may be linked from the gesture. For example, the processor 120 may visually present guide information (e.g., an image, a video, a text, or an animation) including at least one of information 1311 indicating a recognized gesture (e.g., the gesture that is partially similar to the defined at least one gesture input) and information 1313 indicating at least one gesture input that may be linked from the gesture.

According to various embodiments, when at least one gesture input that may be linked from the recognized gesture is recognized (or sensed), the guide information 1311 and/or 1313 may disappear, and the processor 120 may execute a function related to the recognized gesture input. Or, when at least one gesture input that may be linked from the recognized gesture is not recognized (or sensed) during a specified time, the guide information 1311 and/or 1313 may disappear and, in this case, the processor 120 may continuously perform the video recording without executing a separate function.

An electronic device of various embodiments described above may include a memory, at least one camera module, and a processor operatively connected to the memory and the at least one camera module.

According to various embodiments, the processor may, while acquiring first recording data by using the at least one camera module, detect at least one specified gesture input, based on at least a part of the acquired first recording data, execute a function corresponding to the detected gesture input, and store second recording data in the memory, the second recording data being data remaining after excluding, from the acquired first recording data, recording data corresponding to a time interval from a detection initiation time point of the detected gesture input to a detection termination time point of the detected gesture input.

According to various embodiments, the processor may detect a user motion matching with the at least one specified gesture input by less than a specified ratio, at a time point before detecting the at least one specified gesture input, and further exclude recording data related to the detected user motion from the acquired first recording data.

According to various embodiments, the processor may, as at least a part of further excluding the recording data related to the detected user motion, exclude recording data corresponding to a time interval from an acquisition initiation time point of the recording data related to the user motion to the detection initiation time point of the detected gesture input.

According to various embodiments, the processor may acquire audio data related to a user utterance at the same time point as the detection initiation time point of the detected gesture input, and further exclude the acquired audio data from the acquired first recording data.

According to various embodiments, the processor may acquire audio data related to a user utterance within a time range that is specified with a criterion of the detection initiation time point of the detected gesture input, and further exclude, from the acquired first recording data, the acquired audio data and recording data corresponding to a time interval from an acquisition initiation time point of the acquired audio data to the detection initiation time point of the detected gesture input.

According to various embodiments, the processor may apply a fade out effect to partial recording data of the second recording data, apply a fade in effect to other partial recording data of the second recording data, and provide third recording data by linking the partial recording data and the other partial recording data, based on the fade out effect and the fade in effect.

According to various embodiments, the processor may apply the third recording data to some sections related to the recording data corresponding to the time interval from the detection initiation time point of the detected gesture input to the detection termination time point of the detected gesture input, among sections of the second recording data.

According to various embodiments, the processor may adjust a frame rate corresponding to the third recording data to be equal to a frame rate corresponding to the recording data corresponding to the time interval from the detection initiation time point of the detected gesture input to the detection termination time point of the detected gesture input.

According to various embodiments, the electronic device may further include a display device.

According to various embodiments, the processor may process, by a specified display effect, a plurality of frames corresponding to the recording data corresponding to the time interval from the detection initiation time point of the detected gesture input to the detection termination time point of the detected gesture input, by using the display device, and present.

According to various embodiments, the processor may present a button for supporting the restoration of the recording data corresponding to the time interval from the detection initiation time point of the detected gesture input to the detection termination time point of the detected gesture input, by using the display device.

According to various embodiments, the processor may present information about a function corresponding to the detected gesture input, by using the display device, at a time point before executing the function corresponding to the detected gesture input.

According to various embodiments, the processor may present a button for supporting the undoing of the function corresponding to the detected gesture input, by using the display device, at a time point of detecting the specified at least one gesture input.

According to various embodiments, the processor may count a time elapsed after executing the function corresponding to the detected gesture input, and process the undoing of the executed function when receiving a user input on the button before a specified time is counted.

A method for editing a video on the basis of gesture recognition in an electronic device of various embodiments described above may include, while acquiring first recording data by using at least one camera module, detecting at least one specified gesture input, based on at least a part of the acquired first recording data, executing a function corresponding to the detected gesture input, and storing the second recording data in a memory, the second recording data being data remaining after excluding, from the acquired first recording data, recording data corresponding to a time interval from a detection initiation time point of the detected gesture input to a detection termination time point of the detected gesture input.

According to various embodiments, the method for editing the video on the basis of the gesture recognition may further include detecting a user motion matching with the at least one specified gesture input by less than a specified ratio, at a time point before detecting the at least one specified gesture input, and further excluding recording data related to the detected user motion from the acquired first recording data.

According to various embodiments, further excluding the recording data related to the detected user motion may include excluding recording data corresponding to a time interval from an acquisition initiation time point of the recording data related to the user motion to the detection initiation time point of the detected gesture input.

According to various embodiments, the method for editing the video on the basis of the gesture recognition may further include acquiring audio data related to a user utterance at the same time point as the detection initiation time point of the detected gesture input, and further excluding the acquired audio data from the acquired first recording data.

According to various embodiments, the method for editing the video on the basis of the gesture recognition may further include acquiring audio data related to a user utterance within a time range that is specified with a criterion of the detection initiation time point of the detected gesture input, and further excluding, from the acquired first recording data, the acquired audio data and recording data corresponding to a time interval from an acquisition initiation time point of the acquired audio data to the detection initiation time point of the detected gesture input.

According to various embodiments, storing the second recording data in the memory may include applying a fade out effect to partial recording data of the second recording data, applying a fade in effect to other partial recording data of the second recording data, and providing third recording data by linking the partial recording data and the other partial recording data, based on the fade-out effect and the fade-in effect.

According to various embodiments, providing the third recording data may include applying the third recording data to some sections related to the recording data corresponding to the time interval from the detection initiation time point of the detected gesture input to the detection termination time point of the detected gesture input, among sections of the second recording data.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
   memory;
   at least one camera module; and
   a processor,
   wherein the memory stores instructions that, when executed by the processor, cause the electronic device to:
   while acquiring first recording data by using the at least one camera module, detect at least one specified gesture input, based on at least a part of the acquired first recording data;
   execute a function corresponding to the detected gesture input;
   remove the detected gesture input from the acquired first recording data to create second recording data; and
   store the second recording data in the memory, the second recording data being data remaining after excluding, from the acquired first recording data, the detected gesture input, which is excluded by excluding recording data corresponding to a time interval from a detection initiation time point of the detected gesture input to a detection termination time point of the detected gesture input;
   apply a fade out effect to partial recording data of the second recording data;
   apply a fade in effect to other partial recording data of the second recording data;
   provide third recording data by linking the partial recording data with the fade out effect and the other partial recording data with the fade in effect; and
   apply the third recording data to some sections related to the recording data corresponding to the time interval from the detection initiation time point of the detected gesture input to the detection termination time point of the detected gesture input, among sections of the second recording data.

2. The electronic device of claim 1, wherein the instructions, when executed by the processor, cause the electronic device to:
   detect a user motion matching with the at least one specified gesture input by less than a specified ratio, at a time point before detecting the at least one specified gesture input; and
   further exclude recording data related to the detected user motion from the acquired first recording data.

3. The electronic device of claim 2, wherein the instructions, when executed by the processor, cause the electronic device to, as at least a part of further excluding the recording data related to the detected user motion, exclude recording data corresponding to a time interval from an acquisition initiation time point of the recording data related to the user motion to the detection initiation time point of the detected gesture input.

4. The electronic device of claim 1, wherein the instructions, when executed by the processor, cause the electronic device to:
   acquire audio data related to a user utterance at the same time point as the detection initiation time point of the detected gesture input; and
   further exclude the acquired audio data from the acquired first recording data.

5. The electronic device of claim 1, wherein the instructions, when executed by the processor, cause the electronic device to:
   acquire audio data related to a user utterance within a time range that is specified with a criterion of the detection initiation time point of the detected gesture input; and
   further exclude, from the acquired first recording data, the acquired audio data and recording data corresponding to a time interval from an acquisition initiation time point of the acquired audio data to the detection initiation time point of the detected gesture input.

6. The electronic device of claim 1, wherein the instructions, when executed by the processor, cause the electronic device to adjust a frame rate corresponding to the third recording data to be equal to a frame rate corresponding to the recording data corresponding to the time interval from the detection initiation time point of the detected gesture input to the detection termination time point of the detected gesture input.

7. A method for editing a video on the basis of gesture recognition in an electronic device, the method comprising:
   while acquiring first recording data by using at least one camera module, identifying in the first recording data, at least one specified gesture input, based on at least a part of the acquired first recording data;
   executing a function corresponding to the detected gesture input;
   removing the detected gesture input from the acquired first recording data to create second recording data;
   storing the second recording data in a memory, the second recording data being data remaining after excluding, from the acquired first recording data, recording data corresponding to a time interval from a detection initiation time point of the detected gesture input to a detection termination time point of the detected gesture input;
   applying a fade out effect to partial recording data of the second recording data;
   applying a fade in effect to other partial recording data of the second recording data:
   providing third recording data by linking the partial recording data with the fade out effect and the other partial recording data with the fade in effect; and
   applying the third recording data to some sections related to the recording data corresponding to the time interval from the detection initiation time point of the detected gesture input to the detection termination time point of the detected gesture input, among sections of the second recording data.

8. The method for editing the video on the basis of the gesture recognition of claim 7, further comprising:
   detecting a user motion matching with the at least one specified gesture input by less than a specified ratio, at a time point before detecting the at least one specified gesture input; and
   further excluding recording data related to the detected user motion from the acquired first recording data.

9. The method for editing the video on the basis of the gesture recognition of claim 8, wherein further excluding the recording data related to the detected user motion comprises excluding recording data corresponding to a time interval from an acquisition initiation time point of the recording data related to the user motion to the detection initiation time point of the detected gesture input.

10. The method for editing the video on the basis of the gesture recognition of claim 7, further comprising:
    acquiring audio data related to a user utterance at the same time point as the detection initiation time point of the detected gesture input; and further excluding the acquired audio data from the acquired first recording data.

11. The method for editing the video on the basis of the gesture recognition of claim 7, further comprising:
acquiring audio data related to a user utterance within a time range that is specified with a criterion of the detection initiation time point of the detected gesture input; and
further excluding, from the acquired first recording data, the acquired audio data and recording data corresponding to a time interval from an acquisition initiation time point of the acquired audio data to the detection initiation time point of the detected gesture input.

12. A computer program product comprising a memory device having computer-executable instructions stored thereon, the computer-executable instructions when executed by a processor cause an electronic device to perform a method for editing a video on the basis of gesture recognition, the method comprising:
during acquisition of a first recording data by using at least one camera module, identifying in the first recording data, a specified gesture input based on at least a part of the acquired first recording data;
in response to the detected gesture input, removing the detected gesture input from the acquired first recording data to create a second recording data by excluding, from the acquired first recording data, the specified gesture input;
storing the second recording data in a memory;
apply a fade out effect to partial recording data of the second recording data;
apply a fade in effect to other partial recording data of the second recording data;
provide third recording data by linking the partial recording data with the fade out effect and the other partial recording data with the fade in effect; and
apply the third recording data to some sections related to the recording data corresponding to the time interval from the detection initiation time point of the detected gesture input to the detection termination time point of the detected gesture input, among sections of the second recording data.

13. The computer program product of claim 12, wherein the method further comprises performing a function corresponding to the specified gesture input.

14. The computer program product of claim 12, wherein excluding the specified gesture input from the acquired first recording data comprises identifying a time interval from a detection initiation time point of the detected gesture input to a detection termination time point of the detected gesture input.

15. The computer program product of claim 14, wherein excluding the specified gesture input further comprises excluding the recording data related to the detected user motion comprises excluding recording data corresponding to a time interval from an acquisition initiation time point of the recording data related to the user motion to the detection initiation time point of the detected gesture input.

16. The computer program product of claim 14, wherein the method comprises:
acquiring audio data related to a user utterance within a time range that is specified with a criterion of the detection initiation time point of the detected gesture input; and
excluding, from the acquired first recording data, the acquired audio data and recording data corresponding to a time interval from an acquisition initiation time point of the acquired audio data to the detection initiation time point of the detected gesture input.

* * * * *